(12) United States Patent
Zhang et al.

(10) Patent No.: US 11,488,387 B2
(45) Date of Patent: Nov. 1, 2022

(54) METHOD AND SYSTEM FOR IDENTIFYING AN INDIVIDUAL IN A CROWD

(71) Applicant: NEC Corporation, Tokyo (JP)

(72) Inventors: Wen Zhang, Shanghai (CN); Arun Kumar Chandran, Singapore (SG); Hui Lam Ong, Singapore (SG)

(73) Assignee: NEC CORPORATION, Tokyo (JP)

( * ) Notice: Subject to any disclaimer, the term of this patent is extended or adjusted under 35 U.S.C. 154(b) by 226 days.

(21) Appl. No.: 16/968,640

(22) PCT Filed: Mar. 8, 2019

(86) PCT No.: PCT/JP2019/009264
§ 371 (c)(1),
(2) Date: Aug. 10, 2020

(87) PCT Pub. No.: WO2019/188111
PCT Pub. Date: Oct. 3, 2019

(65) Prior Publication Data
US 2021/0049369 A1 Feb. 18, 2021

(30) Foreign Application Priority Data
Mar. 27, 2018 (SG) .......................... 10201802532Y (51) Int. Cl.
*G06K 9/00* (2022.01)
*G06V 20/52* (2022.01)
*G06V 40/16* (2022.01)

(52) U.S. Cl.
CPC ............ *G06V 20/53* (2022.01); *G06V 40/165* (2022.01)

(58) Field of Classification Search
CPC .... G06V 40/171; G06V 10/82; G06V 20/597; G06V 40/165; G06V 40/168;
(Continued)

(56) References Cited

U.S. PATENT DOCUMENTS

| | | |
|---|---|---|
| 2005/0084141 A1 | 4/2005 | Kato et al. |
| 2007/0013791 A1 | 1/2007 | Kinoshita et al. |

(Continued)

FOREIGN PATENT DOCUMENTS

| | | |
|---|---|---|
| JP | 2012-023589 A | 2/2012 |
| JP | 2017-068627 A | 4/2017 |

OTHER PUBLICATIONS

International Search Report for PCT/JP2019/009264 dated May 21, 2019 (PCT/ISA/210).
(Continued)

*Primary Examiner* — Quan M Hua
(74) *Attorney, Agent, or Firm* — Sughrue Mion, PLLC (57) ABSTRACT

The present disclosure relates to methods and systems for identifying an individual in a crowd. The method comprises the steps of capturing a plurality of crowd-viewing images using multiple image-capturing devices. For each image, a reference point within a facial contour of a person in the image is selected. The reference point is selected based on a facial feature on the facial contour of the person. The method further comprises the step of processing the image to obtain one or more angular measurements associated with a posture displayed by the person in the image. Based on the obtained angular measurements, location data of a predetermined body point of the person relative to the reference point is extracted.

17 Claims, 6 Drawing Sheets

(58) Field of Classification Search
CPC ........ G06V 40/19; G06V 10/22; G06V 10/26;
G06V 10/44; G06V 40/10; G06V 10/242;
G06V 10/40; G06V 10/454; G06V
40/107; G06V 40/161; G06V 40/172;
G06V 40/28; G06V 40/40; G06V 40/20;
G06T 2207/30201; G06T 11/00; G06T
15/60; G06T 17/00; G06T 19/00; G06K
9/6271; G06K 9/6267; G06K 9/6256;
G06K 9/6262; G06K 9/6296; G06K
9/6217
See application file for complete search history.

(56) References Cited

U.S. PATENT DOCUMENTS

| | | |
|---|---|---|
| 2008/0025577 A1 | 1/2008 | Kugo et al. |
| 2013/0329964 A1 | 12/2013 | Nishi |
| 2018/0053490 A1* | 2/2018 | Kimura ................. G06F 3/048 |
| 2019/0163966 A1* | 5/2019 | Moriya ................. H04N 7/188 |

OTHER PUBLICATIONS

Written Opinion for PCT/JP2019/009264 dated May 21, 2019 (PCT/ISA/237).

\* cited by examiner

METHOD AND SYSTEM FOR IDENTIFYING AN INDIVIDUAL IN A CROWD

CROSS REFERENCE TO RELATED APPLICATIONS

This application is a National Stage of International Application No. PCT/JP2019/009264 filed Mar. 8, 2019, claiming priority based on Singapore Patent Application No. 10201802532Y filed Mar. 27, 2018, the disclosure of which is incorporated herein in its entirety by reference.

TECHNICAL FIELD

The present disclosure relates broadly, but not exclusively, to a method and system for identifying an individual in a crowd.

BACKGROUND ART

Surveillance is often used by government to monitor behaviour and activities of people in public areas for prevention or investigation of crime. The number of surveillance cameras installed at public areas has increased substantially in recent years. Thus, surveillance can cover much wider areas than before.

Typically, surveillance involves the tracking of a person's location. Facial features or clothing colours captured by surveillance cameras are some examples of the traits that are compared for the purpose of identifying and tracking the location of a person. However, it is noted that comparing the facial features and clothing colours may generate poor results.

For example, faces of people captured by surveillance cameras may not always be clear enough or in suitable angle to allow meaningful comparison. Also, it is noted that it could be difficult to extract the same region on the clothing for comparison. It is usually assumed that the face and body of the person are in straight line in the image, and the colour of the clothing directly below the face of the person in multiple images captured by surveillance cameras are compared to identify the person in the images. However, people may strike different poses while walking or sitting down. As a result, a comparison based on facial features or clothing colours as explained above may generate poor results.

SUMMARY OF INVENTION

Technical Problem

A need therefore exists to provide a method and system for identifying an individual in a crowd that addresses at least one of the problems above or to provide a useful alternative.

Solution to Problem

According to a first aspect of the present disclosure, there is provided a method for identifying an individual in a crowd, the method comprising the steps of: capturing a plurality of crowd-viewing images using multiple image-capturing devices; for each image, selecting a reference point within a facial contour of a person in the image, wherein the reference point is selected based on a facial feature on the facial contour of the person; processing the image to obtain one or more angular measurements associated with a posture displayed by the person in the image; and based on the obtained angular measurements, extracting location data of a predetermined body point of the person relative to the reference point.

According to a second aspect of the present disclosure, there is provided a system for identifying an individual in a crowd, the system comprising: multiple image-capturing devices configured to capture a plurality of crowd-viewing images; and a computer module in communication with the multiple image-capturing devices, wherein the computer module is configured to: for each image, select a reference point within a facial contour of a person in the image, wherein the reference point is selected based on a facial feature on the facial contour of the person; process the image to obtain one or more angular measurements associated with a posture displayed by the person in the image; and based on the obtained angular measurements, extract location data of a predetermined body point of the person relative to the reference point.

BRIEF DESCRIPTION OF DRAWINGS

Embodiments of the present disclosure are provided by way of example only, and will be better understood and readily apparent to one of ordinary skill in the art from the following written description and the drawings.

DESCRIPTION OF EMBODIMENTS

Embodiments of the present disclosure will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "capturing", "selecting", "processing", "extracting", "calculating", "cropping", "comparing", "identifying" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

In the following description, the term "crowd-viewing images" refers to images that include pictures of one or more people and that are captured by an image-capturing device.

In the following description, the term "facial contour" refers to an outline of the face area of a person in the image captured by an image-capturing device.

In the following description, the term "image-capturing device" refers to an electronic camera that can capture images and/or videos of the camera scene.

In the following description, the term "facial feature" refers to a characteristic element of a face.

In the following description, the term "roll angle" refers to an orientation of the face or body of a person with respect to an X-axis of a three-dimensional Cartesian coordinate system overlaid on the image captured by the image-capturing device. Roll angle changes if the face or body is tilted side-to-side.

In the following description, the term "tilt angle" refers to an orientation of the face or body of a person with respect to a Y-axis of a three-dimensional Cartesian coordinate system overlaid on the image captured by the image-capturing device. Tilt angle changes if the face or body is lowered or raised in the forward and backward directions.

In the following description, the term "pan angle" refers to an orientation of the face or body of a person with respect to a Z-axis of a three-dimensional Cartesian coordinate system overlaid on the image captured by the image-capturing device. Pan angle changes if the face or body is rotated sideways.

Figure 1:
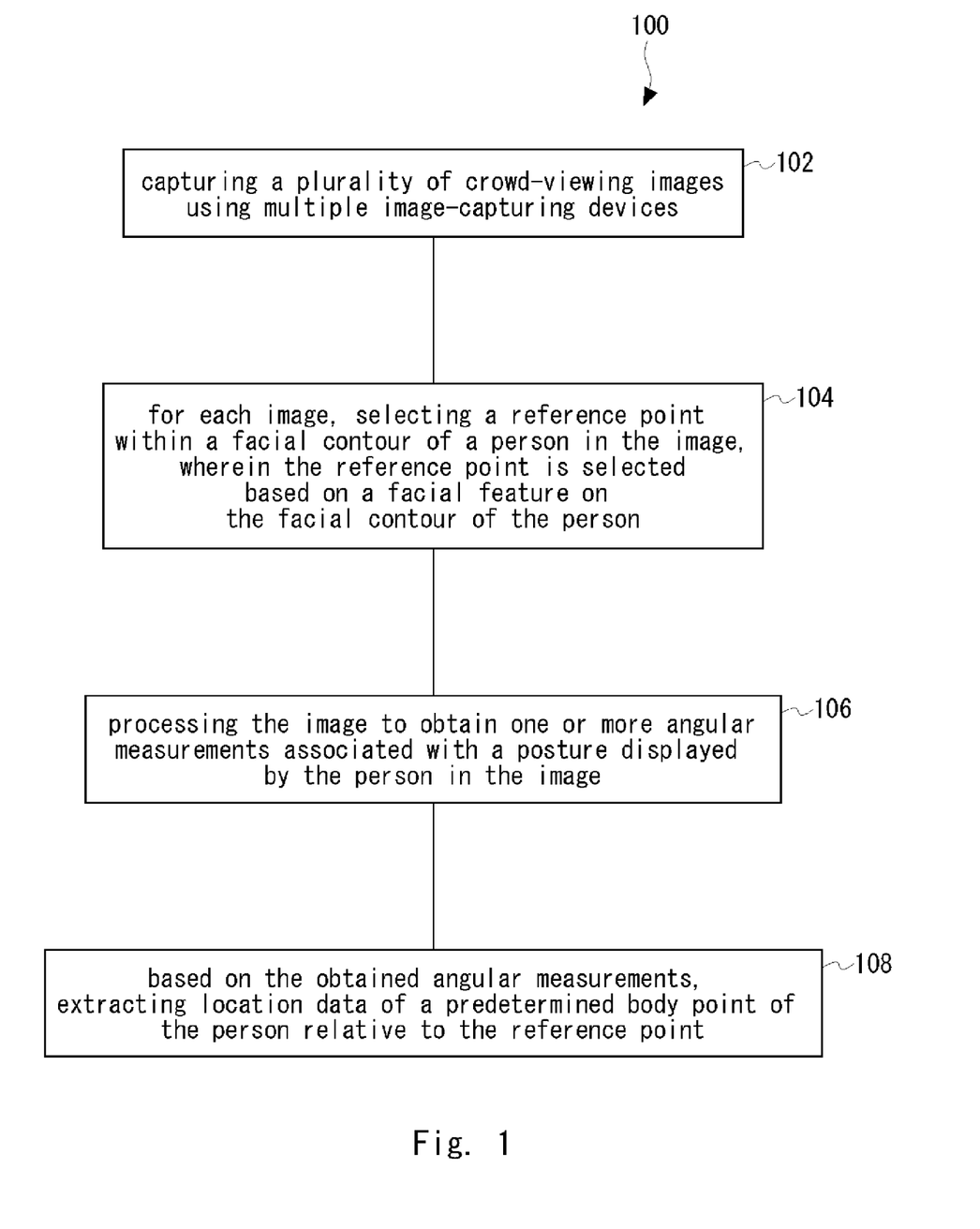
FIG. 1 is shows a flow chart illustrating a method for identifying an individual in a crowd.

FIG. 1 shows a flow chart 100 illustrating a method for identifying an individual in a crowd. At step 102, a plurality of crowd-viewing images is captured using multiple image-capturing devices. At step 104, a reference point is selected within a facial contour of a person in each image captured. The reference point is selected based on a facial feature on the facial contour of the person in the image. At step 106, the image is processed to obtain one or more angular measurements associated with a posture displayed by the person in the image. At step 108, location data of a predetermined body point of the person relative to the reference point is extracted based on the obtained angular measurements.

At step 102, a plurality of crowd-viewing images is captured using multiple image-capturing devices. In an embodiment, the image-capturing devices are closed-circuit televisions (CCTVs) that are installed at public areas to monitor the public. Typically, digital images captured by CCTVs are high-resolution images which can be used for surveillance purposes. The crowd-viewing images captured by the CCTVs include pictures of one or more people. CCTVs are usually installed at places where security is needed, such as a bank, a public gathering place, a traffic junction, and etc. The images captured by the CCTVs are transmitted to a computer module for image processing.

It should be noted that CCTVs can also be video cameras that record videos of the camera scene. The recorded videos can be sent to the computer module to produce digital images which are used for further analysis. In an embodiment, the digital images captured by the CCTVs are analysed in real-time. This may advantageously allow dynamic analysis of the images captured by the CCTVs and timely actions to be taken in the process of tracking an individual. It will be appreciated that the analysis of the images can also include processing of images retrieved from a computer database.

At step 104, a reference point within a facial contour of a person in the image is selected. Specifically, the computer module processes the image to identify a facial feature of a person in the image. Facial features include characteristic elements of a face, such as eyes, ears, nose, and lips of a face. Based on the characteristic elements, a reference point which meets a predetermined condition is selected. For example, the computer module is configured to select a point at a distance away from the one or more of the facial features as the reference point. In another example, the computer module is configured to simply select one of the facial features as the reference point. In an embodiment, the reference point is one or more selected from the following: a middle point between both eyes of the person, one of the eyes of the person, a nose of the person, lips of the person, a middle point between both ears of the person, and one of the ears of the person.

At step 106, the image is processed to obtain one or more angular measurements associated with a posture displayed by the person in the image. The posture includes face and/or body orientations of the person. Angular measurements are angles that represent face and/or body orientations of the person in the image. People may strike different postures when walking or sitting down. Also, CCTVs may capture the picture of a person at an angle, e.g. due to CCTVs being mounted at an elevated height above the ground. Thus, images captured by the CCTVs may not include pictures of the person with the face and body facing directly to the CCTVs. If the face and/or body orientations in the plurality of images are not considered, the results generated from comparison of image data of those images would not be accurate.

In an embodiment, the computer module is configured to determine face orientations of the person to obtain the relevant angular measurements of the face, including the roll angle of the face, a pan angle of the face, and a tilt angle of the face. For example, the computer module detects facial features of the person in the image. The relative positions of the facial features are used to obtain the angular measurements associated with the face orientation.

In a further embodiment, the computer module is configured to determine body orientations of the person to obtain the relevant angular measurements of the body, including the roll angle of the body, a pan angle of the body, and a tilt angle of the body. For example, the computer module detects body parts of the person (such as shoulder, waist, and limbs) in the image. The relative positions of the body parts are used to obtain the angular measurements associated with the body orientation.

It will be appreciated that the angular measurements associated with both face and body orientations can be used together by the computer module to determine the predetermined body point. By considering the angular measurements associated with the face and/or body orientations, the computer module can advantageously extract the accurate location of the predetermined body point and region in the image. In other words, the same part of the body region may be identified for the images captured by the CCTVs. As a result, the method for identifying an individual based on comparison of the predetermined body region in the image can advantageously produce more precise results.

At step 108, location data of the predetermined body point relative to the reference point is extracted based on the obtained angular measurements. In an embodiment, a Cartesian coordinate system is overlaid on the image. The reference point has coordinates $(x_r, y_r)$ on the Cartesian coordinate system. The step of extracting the location data of the predetermined body point involves calculating the coordinates of the predetermined body point $(x_p, y_p)$ relative to coordinates of the reference points.

The calculation of the coordinates of the predetermined body point takes into account the angular measurements associated with the face and/or body orientations. Specifically, trigonometry functions are applied to the angular measurements $\theta$ to determine adjustment coordinates $(x_\theta, y_\theta)$. In other words, the adjustment coordinates can be calculated in each image using one or more trigonometry formulae that include angular measurements as the variables. The adjustment coordinates are used to obtain the coordinates of the predetermined body point, wherein the coordinates of the predetermined body point $(x_p, y_p)$ is $(x_r+x_\theta, y_r+y_\theta)$. Examples of the trigonometry functions are explained in further details below with respect to FIGS. 2-6.

Upon determining the coordinates of the predetermined body point, the predetermined body region is cropped from the image based on the extracted location data. For example, the predetermined body region is a unit square with one of the corners being the coordinates of the predetermined body point. Image data of predetermined body region cropped from the plurality of images captured by multiple CCTVs are compared. Based on the comparison of the image data, the computer module determines whether the persons in the images are the same person. The location of the individual can then be determined based on the location of the CCTVs which captured the images.

Figure 2:
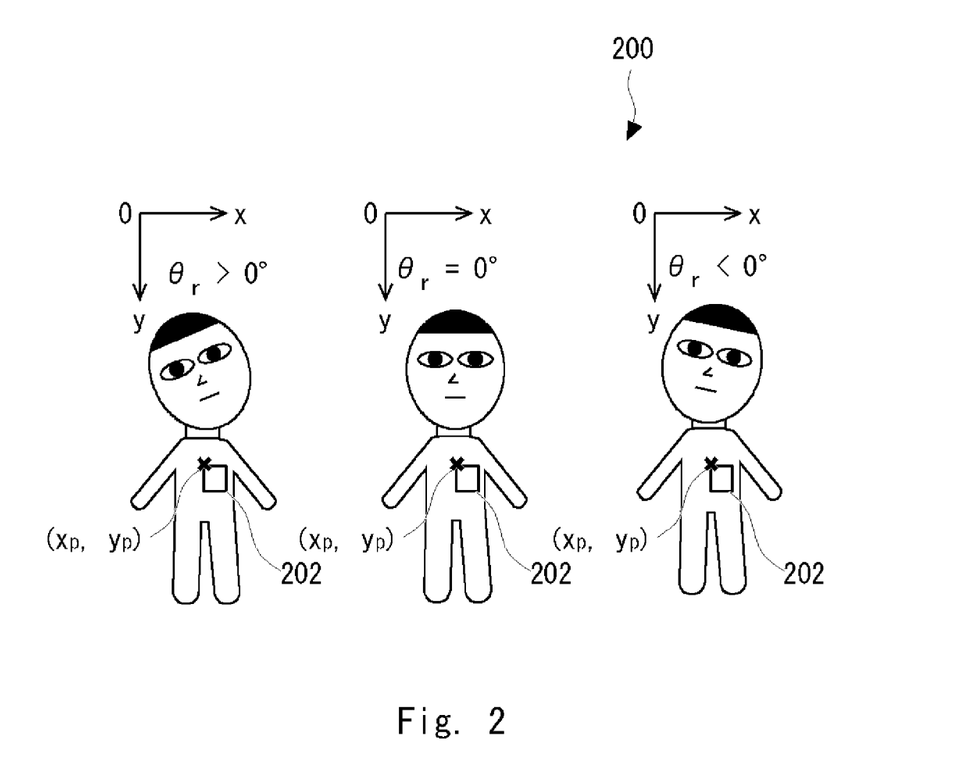
FIG. 2 is shows images illustrating front views of a person with his face in three different roll angles in accordance with an example embodiment.

FIG. 2 shows images 200 illustrating front views of a person with his face in three different roll angles in accordance with an example embodiment.

The first image at the centre illustrates the person standing with his face in an upright manner (roll angle $\theta_r$ of the face is 0°). The second image on the left illustrates the person with his head tilted sideways to his right side or the left side of one viewing the image (roll angle $\theta_r$ of the face is >0°). The third image at the right illustrates the person with his head tilted sideways to his left side or the right side of one viewing the image (roll angle $\theta_r$ of the face is <0°). No pan angle and tilt angle of the face are observed in these images 200. The Cartesian coordinate system includes an origin at the top left corner of each image with an X-axis with positive X going right and a Y-axis with positive Y going downwards.

In an example, it is assumed that the distance between both eyes is d unit and that the distance between the middle point and the lower neck is 3.5 d unit. The predetermined body point $(x_p, y_p)$ is at a distance of d unit directly below the lower neck of the person.

In this example, the middle point of the eyes is selected as a reference point. The coordinates of the reference point is $(x_r, y_r)$. The images 200 are processed to determine the roll angle r of the face. Subsequently, the coordinates of the predetermined body points $(x_p, y_p)$ is calculated in each image using this formula:

$$(x_p, y_p) = (x_r + [3.5d^* \sin \theta_r], y_r + d + [3.5d^* \cos \theta_r])$$

Predetermined body regions 202 are cropped from each of the images. In this example, the predetermined body region 202 is a square with the top left corner of the square being the predetermined body point. The image data of the predetermined body regions 202 cropped from the images are compared to determine if the persons in the images are the same person.

Figure 3:
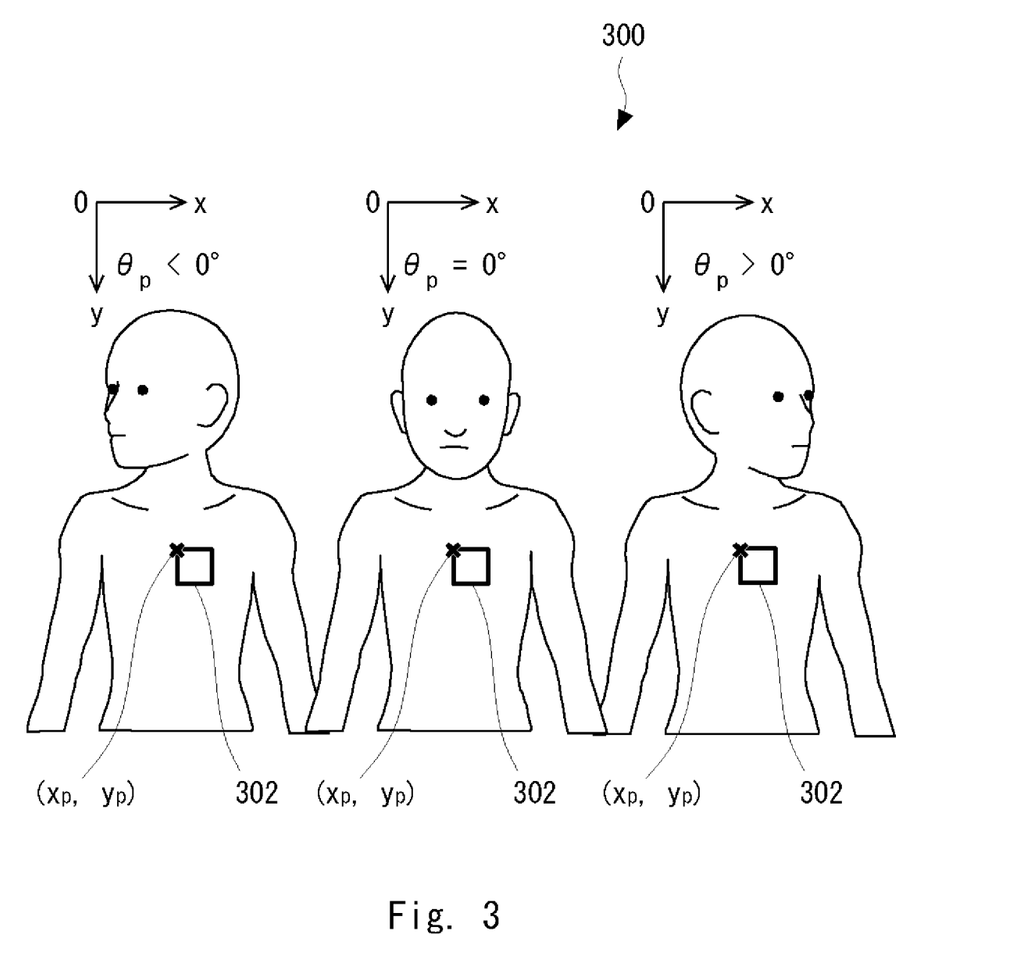
FIG. 3 shows images illustrating front views of a person with his face in three different pan angles in accordance with an example embodiment.

FIG. 3 shows images 300 illustrating front views of a person with his face in three different pan angles in accordance with an example embodiment.

The first image at the centre illustrates the person standing with his face in an upright manner (pan angle $\theta_p$ of the face is 0°). The second image on the right illustrates the person with his head rotated sideways to his left side or the right side of one viewing the image (pan angle $\theta_p$ of the face is >0°). The third image at the left illustrates the person with his head rotated sideways to his right side or the left side of one viewing the image (pan angle $\theta_p$ of the face is <0°). No roll angle and tilt angle of the face are observed in these images 300. The Cartesian coordinate system includes an origin at the top left corner of each image with an X-axis with positive X going right and a Y-axis with positive Y going downwards.

In an example, it is assumed that the distance between both eyes is d unit and that the distance between the back and front of the head is 1.5 d unit. The predetermined body point $(x_p, y_p)$ is at a distance of d unit directly below the lower neck of the person.

In this example, the middle point of the eyes is selected as a reference point. The coordinates of the reference point is $(x_r, y_r)$. The images 300 are processed to determine the pan angle $\theta_p$ of the face. Subsequently, the coordinates of the predetermined body points $(x_p, y_p)$ is calculated in each image using this formula:

$$(x_p, y_p) = (x_r - [1.5d*\sin \theta_p], y_r + 3.5d + d)$$

Predetermined body regions 302 are cropped from each of the images. In this example, the predetermined body region 302 is a square with the top left corner of the square being the predetermined body point. The image data of the predetermined body regions 302 cropped from the images are compared to determine if the persons in the images are the same person.

Figure 4:
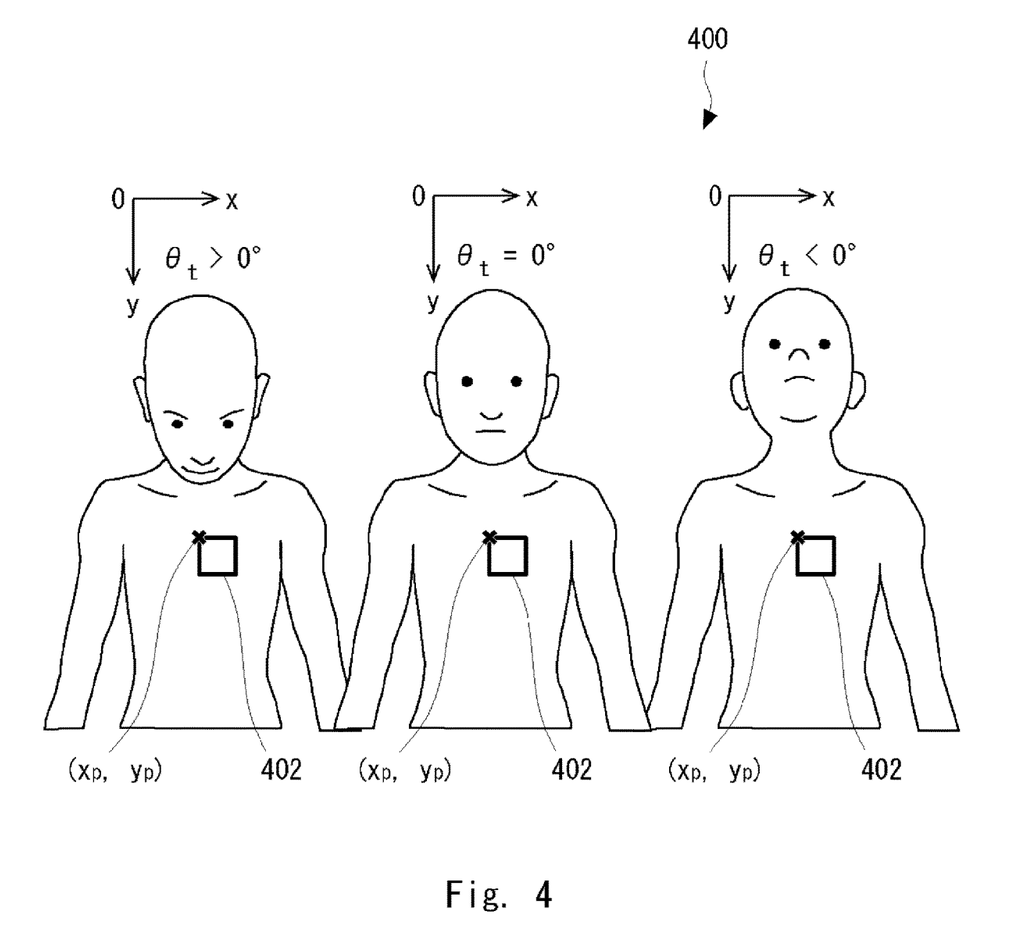
FIG. 4 shows images illustrating front views of a person with his face in three different tilt angles in accordance with an example embodiment.

FIG. 4 shows images 400 illustrating front views of a person with his face in three different tilt angles in accordance with an example embodiment.

The first image at the centre illustrates the person standing with his face in an upright manner (tilt angle $\theta_t$ of the face is 0°). The second image on the right illustrates the person with his head raised (tilt angle $\theta_t$ of the face is <0°). The third image at the left illustrates the person with his head lowered (tilt angle $\theta_t$ of the face is >0°). No roll angle and pan angle of the face are observed in these images 400. The Cartesian coordinate system includes an origin at the top left corner of each image with an X-axis with positive X going right and a Y-axis with positive Y going downwards.

In an example, it is assumed that the distance between both eyes is d unit and that the distance between the middle point and the lower neck is 3.5 d unit. The predetermined body point $(x_p, y_p)$ is at a distance of d unit directly below the lower neck of the person.

In this example, the middle point of the eyes is selected as a reference point. The coordinates of the reference point is $(x_r, y_r)$. The images 400 are processed to determine the tilt angle $\theta_t$ of the face. Subsequently, the coordinates of the predetermined body points $(x_p, y_p)$ is calculated in each image using this formula:

$$(x_p, y_p) = (x_r, y_r + 3.5d*\cos \theta_t + d)$$

Predetermined body regions 402 are cropped from each of the images. In this example, the predetermined body region 402 is a square with the top left corner of the square being the predetermined body point. The image data of the predetermined body regions 402 cropped from the images are compared to determine if the persons in the images are the same person.

It should be noted that the roll, pan and tilt angle of the face may be determined. The coordinates of the predetermined body points $(x_p, y_p)$ may be calculated using this formula:

$$(x_p, y_p) = (x_r + 3.5d*\sin \theta_r - 1.5d*\sin \theta_p, y_r + 3.5d*\cos \theta_r + 3.5d*\cos \theta_t + d)$$

Figure 5:
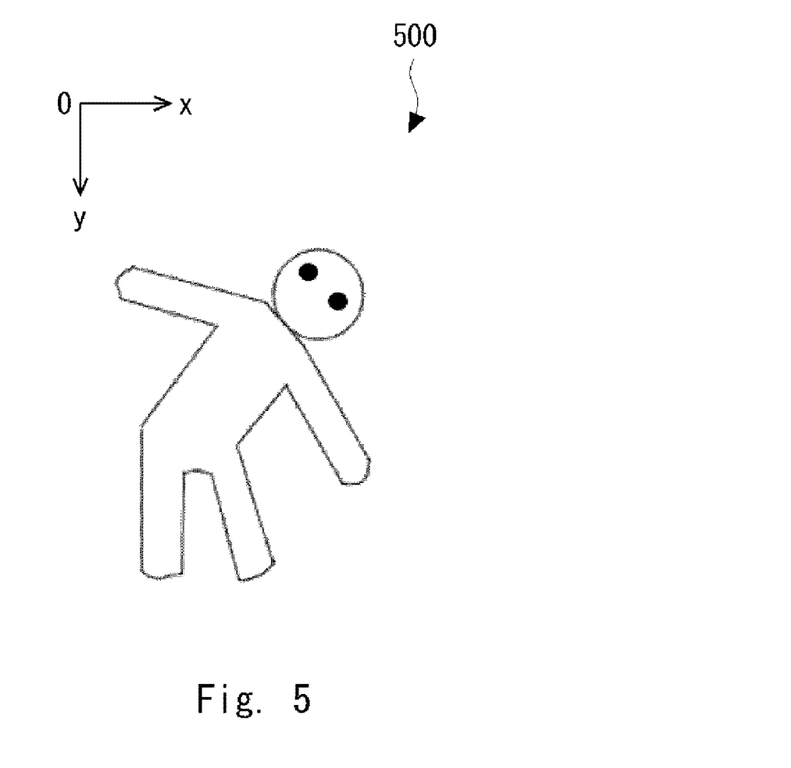
FIG. 5 shows an image illustrating a front view of a person with his body at a roll angle in accordance with an example embodiment.

FIG. 5 shows an image 500 illustrating a front view of a person with his body at a roll angle in accordance with an example embodiment. Specifically, the image illustrates the person with his body rolling to his left side, or the right side of one viewing the image. At this orientation, the roll angle $\alpha_r$ of the body is <0°. The Cartesian coordinate system includes an origin at the top left corner of the image with an X-axis with positive X going right and a Y-axis with positive Y going downwards.

In the example, it is assumed that the distance between both eyes is d unit and that the distance between the middle point and the lower neck is 3.5 d unit. The predetermined body point $(x_p, y_p)$ is at a distance of d unit directly below the lower neck of the person.

In this example, the middle point of the eyes is selected as a reference point. The coordinates of the reference point is $(x_r, y_r)$. The image 500 is processed to determine the roll angle $\alpha_r$ of the body. Subsequently, the coordinates of the predetermined body points $(x_p, y_p)$ is calculated using this formula:

$$(x_p, y_p) = (x_r + 4.5d*\sin \alpha_r, y_r + 4.5d*\cos \alpha_r)$$

Figure 6:
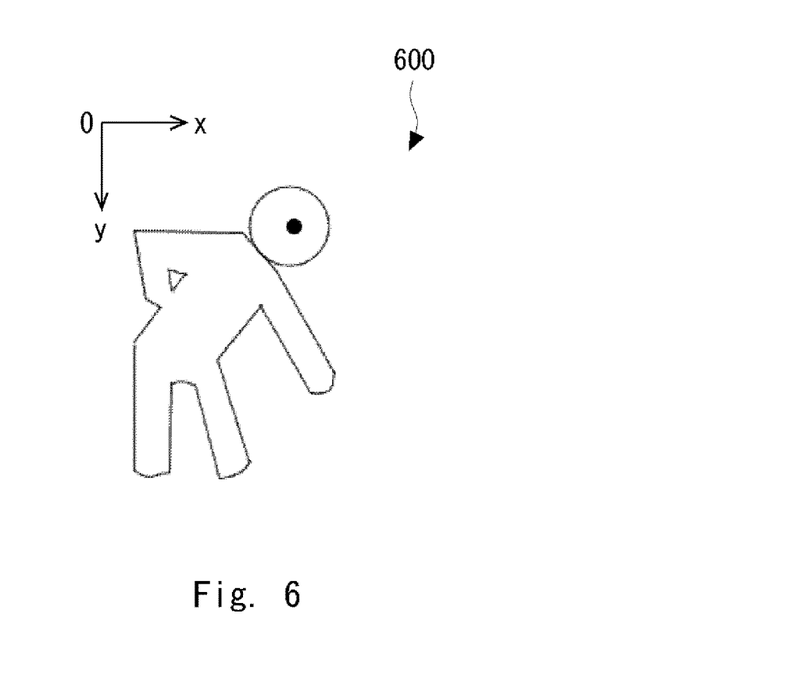
FIG. 6 shows an image illustrating a front view of a person with his body at a roll angle in accordance with another example embodiment.

FIG. 6 shows an image 600 illustrating a front view of a person with his body at a roll angle in accordance with another example embodiment. Specifically, the image illustrates the person with his body rolled sideways to his left side or the right side of one viewing the image (roll angle $\alpha_r$ of the body is <0°) and his face rotated sideways to his left with only one eye visible in the image. In other words, pan angle of the face is >0°. The Cartesian coordinate system includes an origin at the top left corner of the image with an X-axis with positive X going right and a Y-axis with positive Y going downwards.

In this example, the eye visible in the image is selected as a reference point with the coordinates of $(x_r, y_r)$. The formula explained with respect to FIG. 5 can be used to calculate the coordinates of the predetermined body points $(x_p, y_p)$ in this example in FIG. 6.

Figure 7:
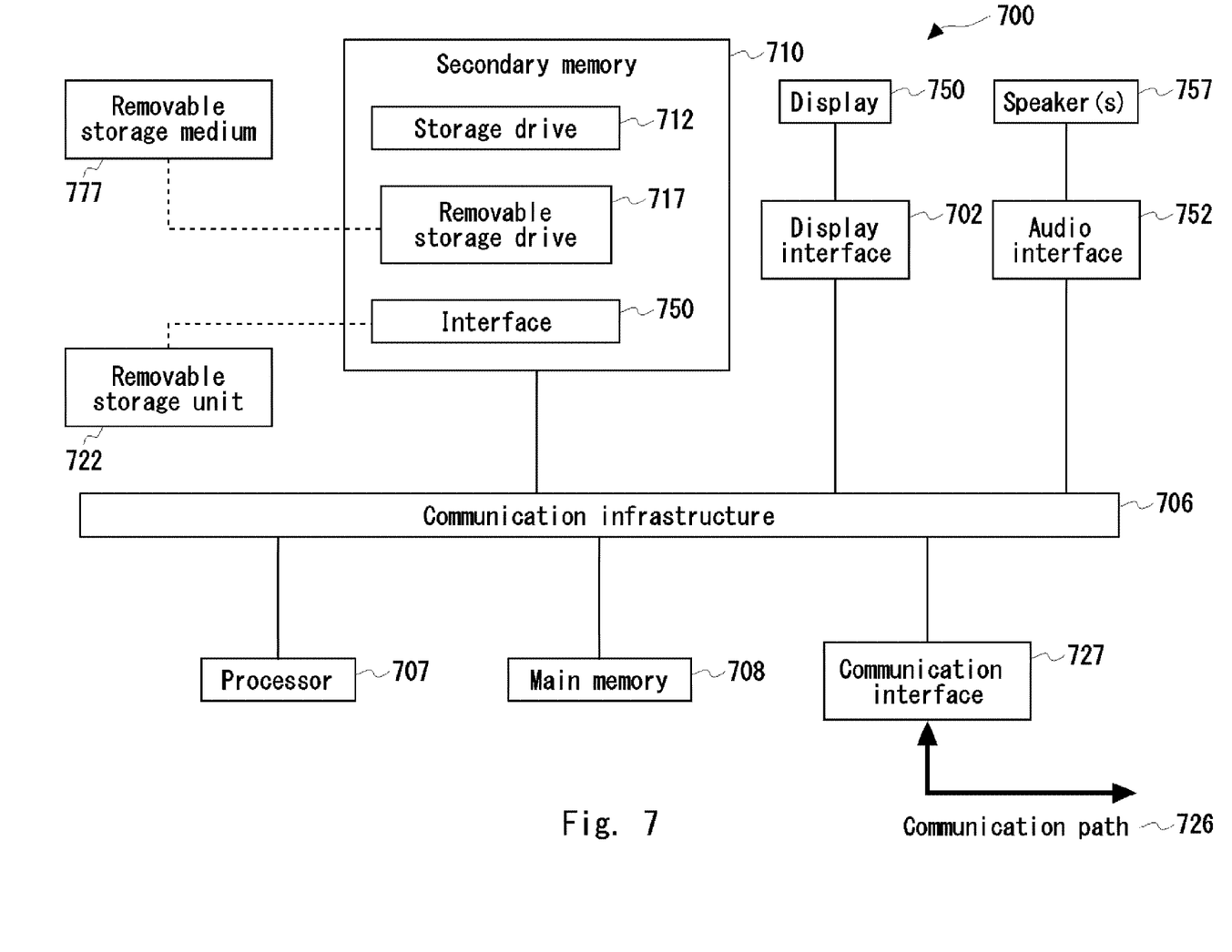
FIG. 7 shows a schematic diagram illustrating a computer suitable for implementing the method and system of the example embodiments.

FIG. 7 depicts an exemplary computing device 700, hereinafter interchangeably referred to as a computer system 700, where one or more such computing devices 700 may be used to identify an individual in a crowd. The exemplary computing device 700 can be used to implement the method 100 shown in FIG. 1. The following description of the computing device 700 is provided by way of example only and is not intended to be limiting.

As shown in FIG. 7, the example computing device 700 includes a processor 707 for executing software routines. Although a single processor is shown for the sake of clarity, the computing device 700 may also include a multi-processor system. The processor 707 is connected to a communication infrastructure 706 for communication with other components of the computing device 700. The communication infrastructure 706 may include, for example, a communications bus, cross-bar, or network.

The computing device 700 further includes a main memory 708, such as a random access memory (RAM), and a secondary memory 710. The secondary memory 710 may include, for example, a storage drive 712, which may be a hard disk drive, a solid state drive or a hybrid drive, and/or a removable storage drive 717, which may include a magnetic tape drive, an optical disk drive, a solid state storage drive (such as a USB flash drive, a flash memory device, a solid state drive or a memory card), or the like. The removable storage drive 717 reads from and/or writes to a removable storage medium 777 in a well-known manner. The removable storage medium 777 may include magnetic tape, optical disk, non-volatile memory storage medium, or the like, which is read by and written to by removable storage drive 717. As will be appreciated by persons skilled in the relevant art(s), the removable storage medium 777 includes a computer readable storage medium having stored therein computer executable program code instructions and/or data.

In an alternative implementation, the secondary memory 710 may additionally or alternatively include other similar means for allowing computer programs or other instructions to be loaded into the computing device 700. Such means can include, for example, a removable storage unit 722 and an interface 750. Examples of a removable storage unit 722 and interface 750 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 722 and interfaces 750 which allow software and data to be transferred from the removable storage unit 722 to the computer system 700.

The computing device 700 also includes at least one communication interface 727. The communication interface 727 allows software and data to be transferred between computing device 700 and external devices via a communication path 726. In various embodiments of the disclosures, the communication interface 727 permits data to be transferred between the computing device 700 and a data communication network, such as a public data or private data communication network. The communication interface 727 may be used to exchange data between different computing devices 700 which such computing devices 700 form part an interconnected computer network. Examples of a communication interface 727 can include a modem, a network interface (such as an Ethernet card), a communication port (such as a serial, parallel, printer, GPIB, IEEE 1394, RJ45, USB), an antenna with associated circuitry and the like. The communication interface 727 may be wired or may be wireless. Software and data transferred via the communication interface 727 are in the form of signals which can be electronic, electromagnetic, optical or other signals capable of being received by communication interface 727. These signals are provided to the communication interface via the communication path 726.

As shown in FIG. 7, the computing device 700 further includes a display interface 702 which performs operations for rendering images to an associated display 750 and an audio interface 752 for performing operations for playing audio content via associated speaker(s) 757.

As used herein, the term "computer program product" may refer, in part, to removable storage medium 777, removable storage unit 722, a hard disk installed in storage drive 712, or a carrier wave carrying software over communication path 726 (wireless link or cable) to communication interface 727. Computer readable storage media refers to any non-transitory, non-volatile tangible storage medium that provides recorded instructions and/or data to the computing device 700 for execution and/or processing. Examples of such storage media include magnetic tape, CD-ROM, DVD, Blu-Ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 700. Examples of transitory or non-tangible computer readable transmission media that may also participate in the provision of software, application programs, instructions and/or data to the computing device 700 include radio or infra-red transmission channels as well as a network connection to another computer or networked device, and the Internet or Intranets including e-mail transmissions and information recorded on Websites and the like.

The computer programs (also called computer program code) are stored in main memory 708 and/or secondary memory 710. Computer programs can also be received via the communication interface 727. Such computer programs, when executed, enable the computing device 700 to perform one or more features of embodiments discussed herein. In various embodiments, the computer programs, when executed, enable the processor 707 to perform features of the above-described embodiments. Accordingly, such computer programs represent controllers of the computer system 700.

Software may be stored in a computer program product and loaded into the computing device 700 using the removable storage drive 717, the storage drive 712, or the interface 750. The computer program product may be a non-transitory computer readable medium. Alternatively, the computer program product may be downloaded to the computer system 700 over the communications path 726. The software, when executed by the processor 707, causes the computing device 700 to perform functions of embodiments described herein.

It is to be understood that the embodiment of FIG. 7 is presented merely by way of example. Therefore, in some embodiments one or more features of the computing device 700 may be omitted. Also, in some embodiments, one or more features of the computing device 700 may be combined together. Additionally, in some embodiments, one or more features of the computing device 700 may be split into one or more component parts.

When the computing device 700 is configured to identify an individual in a crowd, the computing system 700 will have a non-transitory computer readable medium having stored thereon an application which when executed causes the computing system 700 to perform steps comprising: capture a plurality of crowd-viewing images using multiple image-capturing devices; for each image, select a reference point within a facial contour of a person in the image, wherein the reference point is selected based on a facial feature on the facial contour of the person; process the image to obtain one or more angular measurements associated with a posture displayed by the person in the image; and based on the obtained angular measurements, extract location data of a predetermined body point of the person relative to the reference point.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The whole or part of the exemplary embodiments disclosed above can be described as, but not limited to, the following supplementary notes.
(Supplementary Note 1)
A method for identifying an individual in a crowd, the method comprising the steps of:

capturing a plurality of crowd-viewing images using multiple image-capturing devices;

for each image, selecting a reference point within a facial contour of a person in the image, wherein the reference point is selected based on a facial feature on the facial contour of the person;

processing the image to obtain one or more angular measurements associated with a posture displayed by the person in the image; and based on the obtained angular measurements, extracting location data of a predetermined body point of the person relative to the reference point.
(Supplementary Note 2)
The method as claimed in Supplementary Note 1, wherein the location data comprises location coordinates in a Cartesian coordinate system overlaid on the image and wherein extracting the location data of the predetermined body point comprises calculating the location coordinates relative to coordinates of the reference points.

(Supplementary Note 3)

The method as claimed in Supplementary Note 1 or 2, wherein the posture comprises a face orientation of the person and wherein the angular measurements comprise at least one selected from a group consisting of: a roll angle of the face, a pan angle of the face, and a tilt angle of the face.

(Supplementary Note 4)

The method as claimed in any one of the preceding Supplementary Notes, wherein the posture comprises a body orientation of the person and wherein the angular measurements comprise at least one selected from a group consisting of: a roll angle of the body, a pan angle of the body, and a tilt angle of the body.

(Supplementary Note 5)

The method as claimed in any one of the preceding Supplementary Notes, wherein the reference point comprises one or more selected from a group consisting of: a middle point between both eyes of the person, one of the eyes of the person, a nose of the person, lips of the person, a middle point between both ears of the person, and one of the ears of the person.

(Supplementary Note 6)

The method as claimed in any one of the preceding Supplementary Notes, further comprising the step of cropping a predetermined body region based on the extracted location data.

(Supplementary Note 7)

The method as claimed in Supplementary Note 6, further comprising the steps of:

comparing image data of the predetermined body region cropped from the plurality of images captured by the multiple image-capturing devices; and identifying the individual based on the comparison of the image data.

(Supplementary Note 8)

The method as claimed in any one of the preceding Supplementary Notes, wherein the plurality of images is real-time images.

(Supplementary Note 9)

A system for identifying an individual in a crowd, the system comprising:

multiple image-capturing devices configured to capture a plurality of crowd-viewing images; and a computer module in communication with the multiple image-capturing devices, wherein the computer module is configured to:

for each image, select a reference point within a facial contour of a person in the image, wherein the reference point is selected based on a facial feature on the facial contour of the person;

process the image to obtain one or more angular measurements associated with a posture displayed by the person in the image; and based on the obtained angular measurements, extract location data of a predetermined body point of the person relative to the reference point.

(Supplementary Note 10)

The system as claimed in Supplementary Note 9, wherein the location data comprises location coordinates in a Cartesian coordinate system overlaid on the image and wherein the computer module is configured to calculate the location coordinates relative to coordinates of the reference points to extract the location data of the predetermined body point.

(Supplementary Note 11)

The system as claimed in Supplementary Note 9 or 10, wherein the posture comprises a face orientation of the person and wherein the angular measurements comprise at least one selected from a group consisting of: a roll angle of the face, a pan angle of the face, and a tilt angle of the face.

(Supplementary Note 12)

The system as claimed in any one of Supplementary Notes 9 to 11, wherein the posture comprises a body orientation of the person and wherein the angular measurements comprise at least one selected from a group consisting of: a roll angle of the body, a pan angle of the body, and a tilt angle of the body.

(Supplementary Note 13)

The system as claimed in any one of Supplementary Notes 9 to 12, wherein the reference point comprises one or more selected from a group consisting of: a middle point between both eyes of the person, one of the eyes of the person, a nose of the person, lips of the person, a middle point between both ears of the person, and one of the ears of the person.

(Supplementary Note 14)

The system as claimed in any one of Supplementary Notes 9 to 13, wherein the computer module is further configured to crop a predetermined body region based on the extracted location data.

(Supplementary Note 15)

The system as claimed in Supplementary Note 14, wherein the computer module is further configured to:

compare image data of the predetermined body region cropped from the plurality of images captured by the multiple image-capturing devices; and identify the individual based on the comparison of the image data.

(Supplementary Note 16)

The system as claimed in any one of Supplementary Notes 9 to 15, wherein the plurality of images is real-time images.

The invention claimed is:

1. A method for identifying an individual in a crowd, the method comprising the steps of:

capturing a plurality of crowd-viewing images using multiple image-capturing devices;

for each image, selecting a reference point within a facial contour of a person in the image, wherein the reference point is selected based on a facial feature on the facial contour of the person;

processing the image to obtain one or more angular measurements associated with a posture displayed by the person in the image; and based on the obtained angular measurements, extracting location data of a predetermined body point of the person relative to the reference point.

2. The method as claimed in claim 1, wherein the location data comprises location coordinates in a Cartesian coordinate system overlaid on the image and wherein extracting the location data of the predetermined body point comprises calculating the location coordinates relative to coordinates of the reference points.

3. The method as claimed in claim 1, wherein the posture comprises a face orientation of the person and wherein the angular measurements comprise at least one selected from a group consisting of: a roll angle of the face, a pan angle of the face, and a tilt angle of the face.

4. The method as claimed in claim 1, wherein the posture comprises a body orientation of the person and wherein the angular measurements comprise at least one selected from a group consisting of: a roll angle of the body, a pan angle of the body, and a tilt angle of the body.

5. The method as claimed in claim 1, wherein the reference point comprises one or more selected from a group consisting of: a middle point between both eyes of the person, one of the eyes of the person, a nose of the person, lips of the person, a middle point between both ears of the person, and one of the ears of the person.

6. The method as claimed in claim 1, further comprising the step of cropping a predetermined body region based on the extracted location data.

7. The method as claimed in claim 6, further comprising the steps of:
comparing image data of the predetermined body region cropped from the plurality of images captured by the multiple image-capturing devices; and
identifying the individual based on the comparison of the image data.

8. The method as claimed in claim 1, wherein the plurality of images is real-time images.

9. A system for identifying an individual in a crowd, the system comprising:
multiple image-capturing devices configured to capture a plurality of crowd-viewing images; and
a computer module in communication with the multiple image-capturing devices, wherein the computer module is configured to:
for each image, select a reference point within a facial contour of a person in the image, wherein the reference point is selected based on a facial feature on the facial contour of the person;
process the image to obtain one or more angular measurements associated with a posture displayed by the person in the image; and
based on the obtained angular measurements, extract location data of a predetermined body point of the person relative to the reference point.

10. The system as claimed in claim 9, wherein the location data comprises location coordinates in a Cartesian coordinate system overlaid on the image and wherein the computer module is configured to calculate the location coordinates relative to coordinates of the reference points to extract the location data of the predetermined body point.

11. The system as claimed in claim 9, wherein the posture comprises a face orientation of the person and wherein the angular measurements comprise at least one selected from a group consisting of: a roll angle of the face, a pan angle of the face, and a tilt angle of the face.

12. The system as claimed in claim 9, wherein the posture comprises a body orientation of the person and wherein the angular measurements comprise at least one selected from a group consisting of: a roll angle of the body, a pan angle of the body, and a tilt angle of the body.

13. The system as claimed in claim 9, wherein the reference point comprises one or more selected from a group consisting of: a middle point between both eyes of the person, one of the eyes of the person, a nose of the person, lips of the person, a middle point between both ears of the person, and one of the ears of the person.

14. The system as claimed in claim 9, wherein the computer module is further configured to crop a predetermined body region based on the extracted location data.

15. The system as claimed in claim 14, wherein the computer module is further configured to:
compare image data of the predetermined body region cropped from the plurality of images captured by the multiple image-capturing devices; and
identify the individual based on the comparison of the image data.

16. The system as claimed in claim 9, wherein the plurality of images is real-time images.

17. A processing apparatus for identifying an individual in a crowd, the processing apparatus comprising:
at least one memory storing instructions, and
at least one processor configured to execute the instructions to;
select, for each of a plurality of crowd-viewing images captured by multiple image-capturing devices, a reference point within a facial contour of a person in the image, wherein the reference point is selected based on a facial feature on the facial contour of the person;
process the image to obtain one or more angular measurements associated with a posture displayed by the person in the image; and
extract, based on the obtained angular measurements, location data of a predetermined body point of the person relative to the reference point.

* * * * *